(12) United States Patent
Mattes et al.

(10) Patent No.: US 10,221,002 B2
(45) Date of Patent: Mar. 5, 2019

(54) PACKING OF POLYCRYSTALLINE SILICON

(71) Applicants: Joachim Mattes, Burghausen (DE);
Bruno Lichtenegger, Emmerting (DE);
Matthias Vietz, Mattighofen (AT)

(72) Inventors: Joachim Mattes, Burghausen (DE);
Bruno Lichtenegger, Emmerting (DE);
Matthias Vietz, Mattighofen (AT)

(73) Assignee: Wacker Chemie AG, Munich (DE)

( * ) Notice: Subject to any disclaimer, the term of this patent is extended or adjusted under 35 U.S.C. 154(b) by 1147 days.

(21) Appl. No.: 13/861,969

(22) Filed: Apr. 12, 2013

(65) Prior Publication Data

US 2013/0269295 A1 Oct. 17, 2013

(30) Foreign Application Priority Data

Apr. 17, 2012 (DE) .................. 10 2012 206 251

(51) Int. Cl.
*B65D 81/02* (2006.01)
*B65D 81/00* (2006.01)
(Continued)

(52) U.S. Cl.
CPC ............. *B65D 81/00* (2013.01); *B32B 9/045* (2013.01); *B65D 75/38* (2013.01); *B65D 77/02* (2013.01); *B65D 81/051* (2013.01); *Y10T 428/231* (2015.01); *Y10T 428/239* (2015.01); *Y10T 428/2938* (2015.01); *Y10T 428/2942* (2015.01)

(58) Field of Classification Search
CPC ........ B65D 81/00; B65D 81/02; B65D 81/03; B65D 81/05; B65D 81/051; B65D 77/02; B65D 75/38; B32B 9/045; B65B 37/18; B02C 23/08

USPC ........... 53/428; 206/443, 484, 521; 428/378; 383/119
See application file for complete search history.

(56) References Cited

U.S. PATENT DOCUMENTS 4,029,822 A * 6/1977 Comer ................. B65D 77/003
                                                206/497
4,903,859 A * 2/1990 Derby ................ B65D 88/1625
                                                217/36

(Continued)

FOREIGN PATENT DOCUMENTS

CN  201901350U U  7/2011
DE      3640520 A1  6/1988
(Continued)

OTHER PUBLICATIONS

PatBase Abstract for JP20101954252.
(Continued)

*Primary Examiner* — Steven A. Reynolds
(74) *Attorney, Agent, or Firm* — Caesar Rivise, PC

(57) ABSTRACT

A method for packing polycrystalline silicon in the form of fragments or round rods, wherein at least one film in each case is inserted into a cuboidal cardboard box matched to the dimensions of the polycrystalline silicon to be packed, the polycrystalline silicon is introduced into the at least one film, the at least one film of thickness 10 to 1000 μm subsequently being welded and enclosing the polycrystalline silicon, and this at least one film being surrounded by a further film having a reinforcing structure or by a shaping element.

6 Claims, 3 Drawing Sheets

(51) Int. Cl.
  *B32B 9/04* (2006.01)
  *B65D 75/38* (2006.01)
  *B65D 77/02* (2006.01)
  *B65D 81/05* (2006.01)

(56) References Cited

U.S. PATENT DOCUMENTS

| | | | | |
|---|---|---|---|---|
| 5,273,361 | A | * | 12/1993 | Jillson .................. B32B 3/12 383/109 |
| 2005/0034430 | A1 | * | 2/2005 | Holzlwimmer ........... B65B 1/32 53/469 |
| 2005/0196080 | A1 | * | 9/2005 | Stone .................... B65D 19/06 383/119 |
| 2006/0191814 | A1 | * | 8/2006 | Wasserman ............ B65D 81/03 206/522 |
| 2009/0056279 | A1 | * | 3/2009 | Sasaki ................... B65D 31/04 53/449 |
| 2010/0012550 | A1 | * | 1/2010 | Dedmon ............. B65D 77/061 206/600 |
| 2010/0154357 | A1 | | 6/2010 | Wochner et al. |

FOREIGN PATENT DOCUMENTS

| | | |
|---|---|---|
| DE | 102007027110 A1 | 12/2008 |
| EP | 1334907 A1 | 8/2003 |
| EP | 2030905 A2 | 3/2009 |
| JP | 2008189360 A | 8/2008 |
| JP | 2009208827 A | 9/2009 |
| JP | 2010195425 A2 | 9/2010 |
| JP | 2012056579 A2 | 3/2012 |

OTHER PUBLICATIONS

PatBase Abstract for JP2012056579.
PatBase abstract for CN 201901350 U (2011).
PatBase abstract for JP 2008189360 (2008).
PatBase abstract for JP 2009-208827 A1.
PatBase abstract for DE 36 40 520 A1.

* cited by examiner

PACKING OF POLYCRYSTALLINE SILICON

BACKGROUND OF THE INVENTION

The invention relates to the packing of polycrystalline silicon.

Polycrystalline silicon (polysilicon) is predominantly deposited by means of the Siemens process from halosilanes such as trichlorosilane and then comminuted with minimum contamination to polycrystalline silicon fragments.

For uses in the semiconductor and solar industries, chunk polysilicon with minimum contamination is desirable. Therefore, the material should also be packed with low contamination before it is transported to the customer.

Tubular bagging machines, which are suitable in principle for packing of chunk silicon, are commercially available. A corresponding packing machine is described, for example, in DE 36 40 520 A1.

Chunk polysilicon is a sharp-edged, non-free-flowing bulk material. It is therefore necessary to ensure in the course of packing that the material does not pierce or in the worst case even completely destroy the customary plastic bags in the course of filling and in the course of packing, in the course of transport and in the course of unpacking, especially since this would be associated with contamination of the polycrystalline silicon.

In order to avoid problems in the course of filling into plastic bags, the commercial packing machines have to be suitably modified for the purpose of packing polysilicon.

DE 10 2007 027 110 A1 discloses a method for packaging polycrystalline silicon, in which polycrystalline silicon is filled by means of a filling device into a freely suspended, completely formed bag, and the filled bag is subsequently closed, wherein the bag consists of high-purity plastic with a wall thickness of from 10 to 1000 µm, the filling device comprising a freely suspended energy absorber of a nonmetallic low-contamination material, which is introduced into the plastic bag before filling with the polycrystalline silicon and by way of which the polycrystalline silicon is filled into the plastic bag, and the freely suspended energy absorber subsequently being removed from the plastic bag filled with polycrystalline silicon, and the plastic bag being closed.

Such a process, which envisages an energy absorber within the plastic bag, can substantially prevent piercing of the plastic bag during the packing operation. However, this is only true of small or lightweight fragments.

It has been found that the risk of bag damage increases proportionally to the fragment mass.

One way of reducing the piercing rate which is conceivable in principle, by using a thicker bag film, has not been found to be very practicable, especially since such a less flexible film would be difficult to handle.

Such piercing of the bag, however, can occur not only during packing, but also in the course of transport to the customer. Chunk polysilicon is sharp-edged, and so, in the event of unfavorable orientation of the fragments in the bag, relative movement of the fragments with respect to the bag film, or pressure of the fragments thereon, can cause them to cut through or pierce the bag film.

Fragments protruding from the bag packing can directly be contaminated unacceptably by surrounding materials, and fragments within by incoming ambient air.

In this regard, no solutions are known in the prior art.

These problems gave rise to the objective of the invention.

DESCRIPTION OF THE INVENTION

Figure 1:
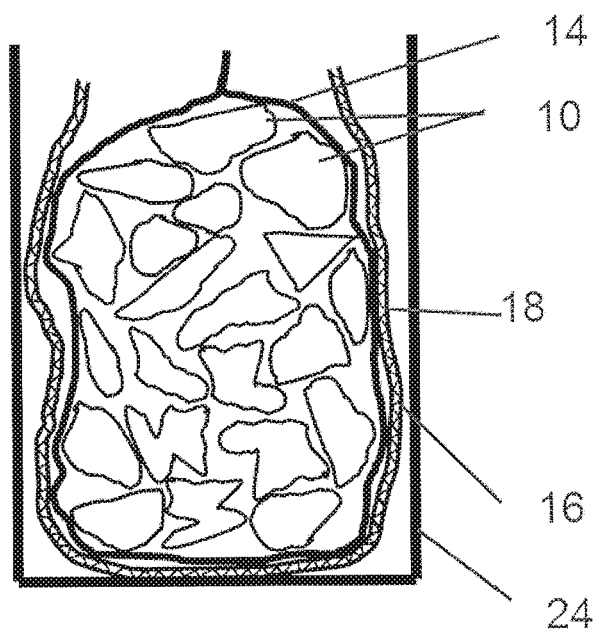
FIG. 1 is a simplified, side elevation view of polycrystalline silicon fragments surrounded by an inner film and an outer film, with a reinforcing structure (air bubble film), packaged in a box.
Figure 2:
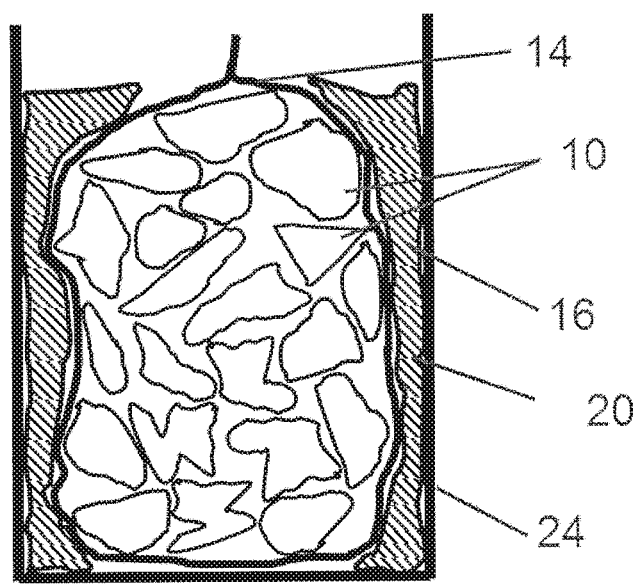
FIG. 2 is a simplified, side elevation view of polycrystalline silicon fragments surrounded by an inner film and an outer film in the form of a shaping element, packaged in a box.
Figure 3:
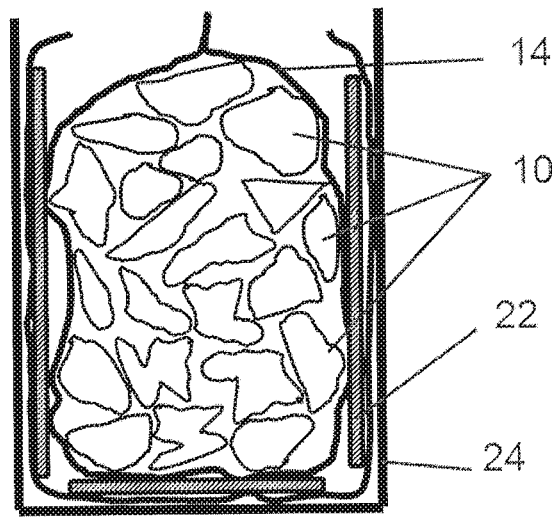
FIG. 3 is a simplified, side elevation view of polycrystalline silicon fragments surrounded by an inner film and an outer film and oval or rectangular separating elements between the inner and outer film, packaged in a box.
Figure 4:
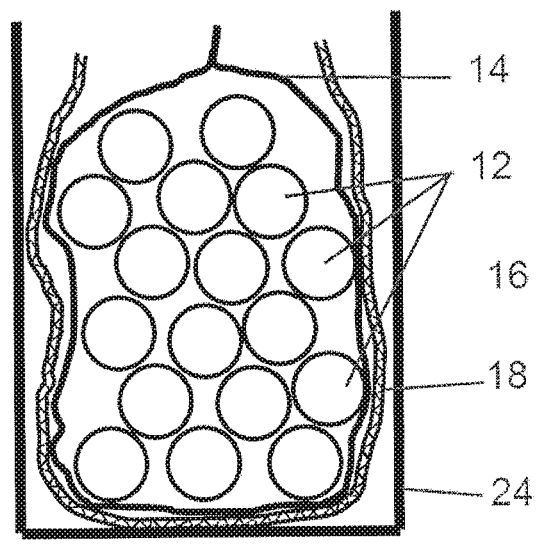
FIG. 4 is a simplified, side elevation view of polycrystalline rods surrounded by an inner film and an outer film, with a reinforcing structure (air bubble film), packaged in a box.
Figure 5:
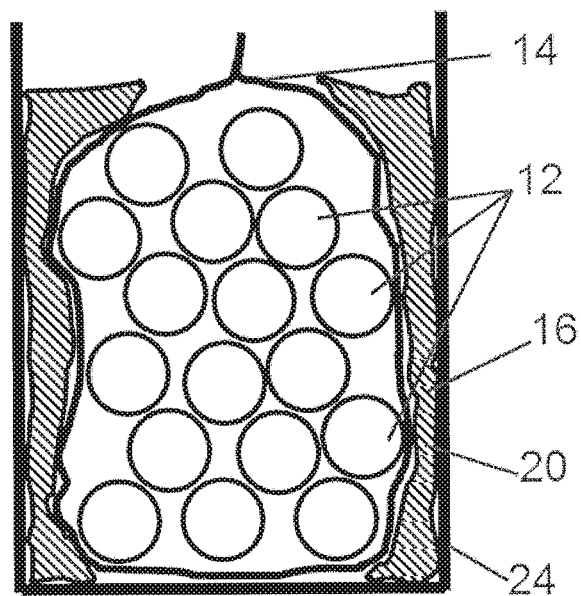
FIG. 5 is a simplified, side elevation view of polycrystalline rods surrounded by an inner film and an outer film in the form of a shaping element, packaged in a box.
Figure 6:
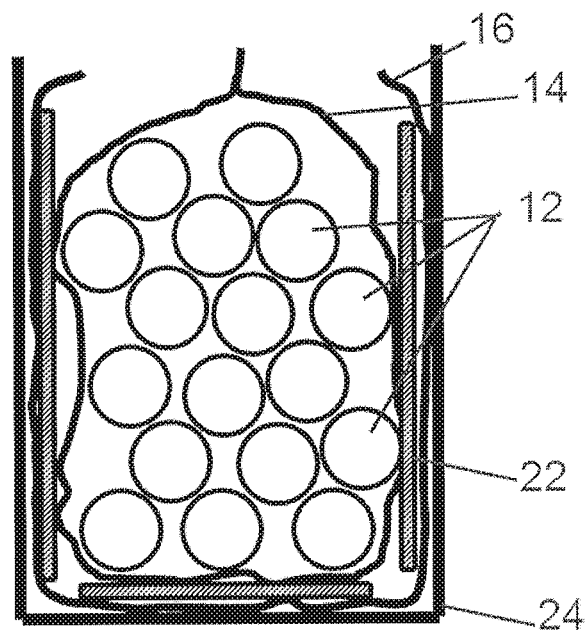
FIG. 6 is a simplified, side elevation view of polycrystalline rods surrounded by an inner film and an outer film and oval or rectangular separating elements between the inner and outer film, packaged in a box.

The object of the invention is achieved by polycrystalline silicon in the form of one or more fragments 10 (see FIGS. 1-3) or of one or more round rods 12 (see FIGS. 4-6), surrounded by at least one film 14 of thickness 10 to 1000 µm which encloses the polycrystalline silicon 10, 12, this at least one film being surrounded by a further film 16 having a reinforcing structure 18 or by a shaping element 20.

The object is additionally achieved by packing of the aforementioned polycrystalline silicon 10, 12 by welding at least one of the films 14, 16, followed by introduction into a transport container comprising separating elements 22 or cardboard boxes 24.

The object is also achieved by packing of that polycrystalline silicon 10, 12 by introduction into a cardboard box 24, followed by welding of at least one of the films 14, 16.

Finally, the object is also achieved by a method for packing polycrystalline silicon 10, 12 in the form of fragments 10 or round rods 12, wherein at least one film 14 in each case is inserted into a cuboidal cardboard box 24 matched to the dimensions of the polycrystalline silicon 10, 12 to be packed, the polycrystalline silicon 10, 12 is introduced into the at least one film 14, the at least one film of thickness 10 to 1000 µm subsequently being welded and enclosing the polycrystalline silicon 10, 12, and this at least one film being surrounded by a further film 16 having a reinforcing structure 18 or by a shaping element 20.

The invention further provides for the use of Rolamit® for stabilization of the packing of polycrystalline silicon in the form of a fragment or of a round rod, surrounded by at least one film of thickness 10 to 1000 µm which encloses the polycrystalline silicon, and for the use of stretch film or wrapping film or shrink film for stabilization of the packing of polycrystalline silicon in the form of a fragment or of a round rod, surrounded by at least one film of thickness 10 to 1000 µm which encloses the polycrystalline silicon, and for the use of wedge-shaped elements for stabilization of the packing of polycrystalline silicon, wherein the polycrystalline silicon is present in at least one film and the at least one film containing polycrystalline silicon is in a cardboard box, with wedge-shaped elements nestling against an upper side of the cardboard box and/or against a side wall of the cardboard box and against the at least one film containing polycrystalline silicon.

The invention is based on an anti-pierce and -cut packing through an additionally introduced stabilizing bag with reinforcing structure, which keeps the fragments permanently fixed in place.

The packing bags are ideally filled directly in a surrounding cardboard box vessel, as a result of which not only the protective effect of the cardboard box walls but also a high packing density is achieved.

Typically, silicon fragments are packed in thin-wall (film-thickness 30-500 µm) flexible single or multiple bags. Preference is given to the use of double bags.

The invention relates to polycrystalline silicon in the form of one or more fragments 10 or of a round rod 12, surrounded by at least one film 14 of thickness 10 to 1000 µm which encloses the fragment 10 or the round rod 12, this at least one film 14 being surrounded by a further film 16 having a reinforcing structure 18.

The fragments 10 are preferably fragments each having a weight of at least 50 g.

The fragments 10 may also be a fragment or a round rod having a weight of greater than or equal to 2 kg.

As mentioned above, the invention relates to a method for packing polycrystalline silicon in the form of fragments 10 or round rods 12, wherein at least one film in each case is inserted into a cuboidal cardboard box 24 matched to the dimensions of the polycrystalline silicon to be packed, the polycrystalline silicon is introduced into the at least one film 14, the at least one film of thickness 10 to 1000 µm subsequently being welded and enclosing the polycrystalline silicon, and this at least one film 14 being surrounded by a further film 16 having a reinforcing structure 18 or by a shaping element 20.

The film with a reinforcing structure 18 protects the fragment 10 from mechanical influences.

The film with reinforcing structure 18 is preferably an air bubble film or a Rolamit® film.

Rolamit® is a registered trademark of Pavag Folien AG, Switzerland.

Instead of a film with reinforcing structure 18, a shaping element 20 may be provided. The shaping element 20 may consist of PU, for example PU foam, or of polyester. Expandable polystyrene is likewise suitable.

The inner films 14 are preferably welded. The film with reinforcing structure 18 may likewise be welded, but this is not absolutely necessary.

For stabilization of the inner film 14, it is possible to use stretch film or wrapping film or shrink film. This may be provided before or after the welding of the inner film.

The fragments 10 welded in film 14 are introduced into a transport container or an outer packing 24.

The transport container, ideally a large cardboard box 24, may have separating elements 22, for example a set of dividers, which protects the packed fragments 10 from damage.

It has been found to be particularly advantageous to use cardboard boxes, ideally cuboidal cardboard boxes, rather than separating elements. These cardboard boxes are preferably matched to the size of the packing bags or to the amount and dimensions of the polycrystalline silicon to be packed. For this purpose, it is possible, for example, to undertake the packing of the polysilicon into the packing bag within a low-contamination outer box of suitable dimensions, and then to insert the packing bag into a cardboard box. The outer box and the cardboard box are of approximately equal dimensions. The use of the outer box has the advantage that the packing bag in the course of filling does not bulge before the final welding.

The packing bags are preferably inserted into the cardboard boxes before being filled with fragments.

The filling of the packing bag can likewise be effected outside the cardboard box. In this case, filled packing bags are inserted into the cardboard box.

These cardboard boxes are subsequently transferred to the transport container or the outer packing, and in this case replace the separating elements or the sets of dividers.

The cardboard box preferably has a lateral oval or rectangular opening. This serves for easier removal of the cardboard boxes from the transport container.

The cardboard box preferably comprises a tear strip with adhesive bonding or perforation. This serves for easier opening of the cardboard box by the customer. For removal of the packing bags from the cardboard box, this can prevent any need to grasp the bag film to pull it out, which constitutes a piercing risk.

The cardboard box preferably has cutouts or slots in the region of the cardboard box opening. This serves to facilitate the operation of folding in the bag ends in the cardboard box, which contributes to protection of the bag film and to a reduction in the risk of piercing caused by the folding-in operation.

Shape-fitting packing of the material can be achieved by a suitable cardboard box lid construction that can be folded in.

Equally suitable are wedge-shaped or half-shell elements which nestle against the film containing polycrystalline silicon and against the upper side of the cardboard box or against a side wall of the cardboard box. The wedge-shaped element consists of PU, for example PU foam, or of polyester. Equally suitable is expandable polystyrene.

The use of cardboard boxes avoids any bulges in the transport container, which may, for example, be a large cardboard box, through improved stability compared to a set of dividers, which does not give any barrier to the large cardboard box.

Thus, the fragments are wrapped once or more than once in thin, flexible films which enclose the fragments, and introduction of an additional stabilizing packing bag having a reinforcing structure, or shaping elements, give an additional barrier against piercing and cuts.

Fragment stabilization with an additional special bag allows a reduction in (or the absence of) the volume of air sucked in by/ejected from the bag and enclosed therein prior to the welding of the packing bags, since the stabilizing effect that the reduction in volume otherwise has is already ensured in full or in part by the additionally introduced stabilizing bag film.

As a result of the reduction in/absence of the volume reduction, the bag film in the course of suction/ejection is pressed less strongly against the potentially sharp-edged fragment edges. This too prevents piercing.

If there is nevertheless piercing of the inner packing bag in the course of transport of the filled packing bags, the additional special bag (film with reinforcing structure or film with shaping element) can maintain the stabilization of the fragments.

The cardboard box and packing bags present therein give the following advantages:

Fragments are placed directly onto the bag film supported by the cardboard box. As a result, the weight does not act solely on the bag films at any time.

In the course of handling of the packing bag during introduction into the transport container, it is necessary to grasp not the bag film itself but merely the cardboard box. There is thus no pull on the bag film, which could constitute a risk of piercing. This is of course also true in the course of unpacking. As a result, the bag films are ideally protected.

As a result of the optimal matching of the size of the packing bags to the cardboard box, after the insertion of the packing bags into the cardboard box, the bag opening remains opened for optimal filling without any particular precautions. In contrast, flat bags would have to be held open by suitable measures for the filling operation.

Instead of specially folded, self-supporting bags which are more complex to produce, it is possible to resort to simply folded and welded flat bags.

The clearly delimited geometric dimensions of the cardboard boxes counteract any otherwise unshapely filling of the packing bags or exceedance of the maximum fill height.

In the transport container, the volume is optimally utilized and thus a maximum packing density is achieved.

Unshapely packing bags in the transport vessel, in spite of flexible sets of dividers, result in constrictions (compression) and empty spaces, which can lead to mutual piercing of the packing bags, or allow excessive movement of the packing bags during transport (cuts, abrasion of bag film). This prevents the inventive solution.

With defined cardboard box dimensions, relative movements between packing bag and cardboard box are substantially avoided.

The surrounding cardboard box forms an additional protective barrier between the packing bags.

The handling of the cardboard boxes is easily automatable, for example by use of robots with simple grips or by means of roller conveyors.

It has also been found to be advantageous to introduce additional separating elements or base sheets with thickness 0.1-5 mm in the base region between the individual layers of the packing bags. The separating elements preferably have an oval or rectangular shape. In the case of rectangular separating elements, these should have rounded corners. This prevents, in an effective and lasting manner, fragments from ultimately piercing the outermost bag film layer as a result of vertical impacts which occur in the course of transport.

The material of the additional stabilizing bag (film with reinforcing structure) and of the separating element or of the base sheet preferably corresponds to the material of the packing bags and has comparable surface cleanliness. This is advantageous in terms of disposal and recycling.

The additional stabilizing packing bag (film with reinforcing structure) may also take the form of a simple film insert without any welding.

In the course of filling of the bag present in the cardboard box with polysilicon, the bag is preferably positioned obliquely at an angle of 15 to 65° to the longitudinal axis thereof. This gives ergonomic advantages.

In addition, in the course of manual filling of the bag, rolling of fragments away to the side in the direction of the cardboard box wall is prevented, this being possible in the case of vertical positioning of the packing and possibly leading to bulging of the cardboard box.

Rolling of fragments back in the direction of the filling orifice is also avoided, this being possible in the case of purely horizontal filling.

EXAMPLE

In experiments each with 2 large packages with 32 packing bags (fragment mass 200-3000 g), it was possible to reduce the piercing rate of the outer packing bag from 31% without a cardboard box and additional stabilizing bag to 5% with a cardboard box and additionally stabilizing bag (air bubble film, Rolamit®).

What is claimed is:

1. Polycrystalline silicon in a form a plurality of fragments or at least one round rod, surrounded by at least one film of thickness 10 to 1000 μm which encloses the polycrystalline silicon, wherein the at least one film is surrounded by a further film having a reinforcing structure or by a shaping element, said reinforcing structure or shaping element stabilizing the polycrystalline silicon in the film enclosing the polycrystalline silicon and providing for substantial avoidance of relative movement of the polycrystalline silicon with respect to the film to prevent piercing and cutting of the film.

2. The polycrystalline silicon as claimed in claim 1, wherein the film with reinforcing structure is an air bubble film.

3. The polycrystalline silicon as claimed in claim 1, wherein the shaping element consists of polyurethane, polyester, expandable polystyrene, or another plastic.

4. The polycrystalline silicon as claimed in claim 1, wherein at least one oval or rectangular separating element of thickness 0.1 to 5 mm is present between two of the films.

5. A method for packing the polycrystalline silicon of claim 1, said method comprising welding at least one of the films, followed by introduction into a transport container comprising separating elements or cardboard boxes.

6. A method for packing the polycrystalline silicon of claim 1, said method comprising introducing the polycrystalline silicon into a cardboard box, followed by welding of at least one of the films.

* * * * *